United States Patent [19]
Albo et al.

[11] Patent Number: 5,648,782
[45] Date of Patent: Jul. 15, 1997

[54] MICROBURST DETECTION SYSTEM

[75] Inventors: Eugene David Albo; Robert Kent Goodrich, both of Boulder, Colo.

[73] Assignee: University Corporation for Atmospheric Research, Boulder, Colo.

[21] Appl. No.: 539,014

[22] Filed: Oct. 3, 1995

[51] Int. Cl.[6] .................................................... G01S 13/95
[52] U.S. Cl. .................................................... 342/26
[58] Field of Search .......................... 342/26; 340/968, 340/963; 364/420, 434, 274.6; 395/3, 61, 900

[56] References Cited

U.S. PATENT DOCUMENTS

| | | | |
|---|---|---|---|
| 5,208,587 | 5/1993 | Comman | 342/26 |
| 5,247,303 | 9/1993 | Cornelius | 342/26 |
| 5,257,021 | 10/1993 | Comman | 342/26 |
| 5,315,297 | 5/1994 | Comman | 342/26 |
| 5,351,045 | 9/1994 | Comman | 342/26 |

OTHER PUBLICATIONS

Kessinger, C., et al; A Summary of Microburst Characteristics from Low–Reflectivity Storms; 23rd Conference on Radar Meteorology, vol. 1, Sep. 1986, pp. J105–J108.

Hjelmfelt, M.; Structure and Life Cycle of Microburst Outflows Observed in Colorado; Journal of Applied Meteorology, vol. 27, No. 8, Aug. 1988, pp. 900–927.

Elmore, K.L., et al; A Cursory Study of F–Factor Applied to Doppler Radar; 3rd International Conference on the Aviation Weather System, Amer. Meteor. Soc., 1989, pp. 130–134.

Mahoney, W., et al; The Evolution and Fine-Scale Structure of a Microburst–Producing Cell; Monthly Weather Review, vol. 119, No. 1, Jan. 1991, pp. 176–192.

Hertz et al; Introduction to the Theory of Neutral Computation; Addison Wesley Publishers, 1991, pp. 89–162.

Dixon, M., et al; TITAN: Thunderstorm Identification, Tracking Analysis, and Nowcasting—A Radar–Based Methodology; Journal of Atmospheric and Oceanic Technology, vol. 10, No. 6, Dec. 1993, pp. 785–797.

Mann, D.; TDWR Clutter Residue Map Generation and Usage; Project Report ATC–14, Lincoln Laboratory, MIT; Jan. 1988.

Merritt, M.; Microburst Divergence Deflection for Terminal Droppler Weather Radar (TDWR); Project Report ATC–181, Lincoln Laboratory, MIT; Sep. 1991.

Hynek, D.; Use of Clutter Residue Editing Maps During the Denver 1988 Terminal Doppler Weather Radar (TDWR) Tests; Project Report ATC–169, Lincoln Laboratory, MIT; Jan. 1990.

Goldburg, M.; Clutter Rejection for Doppler Weather Radars with Multirate Sampling Schemes; Project Report ATC–149, Lincoln Laboratory, MIT; Dec. 1990.

Newell, O., et al.; ASR–9 Microburst Detection Algorithm; Project Report ATC–197, Lincoln Laboratory, MIT; Oct. 1993.

Delanoy, R., et al; Machine Intelligent Gust Front Algorithm; Project Report ATC–196, Lincoln Laboratory, MIT; Nov. 1993.

*Primary Examiner*—Daniel T. Pihulic
*Attorney, Agent, or Firm*—Duft, Graziano & Forest, P.C.

[57] ABSTRACT

A radar station utilizes fuzzy logic processing to detect atmospheric microburst events. The detection process accesses radar velocity measurements to calculate wind shear and produce a wind shear likelihood image. Reflectivity measurements are used to create a reflectivity likelihood image as an indicator of storm activity. A clutter image of stationary objects close to the radar is used to create a clutter likelihood image as an indicator of false alarms. A weighting factor is applied to each set of wind shear, reflectivity, and clutter likelihood data, and the values are combined to produce a combined likelihood image. The combined likelihood image is subjected to averaging over a fixed area to eliminate spurious readings, and positions having a sufficient size in combination with a likelihood value exceeding a minimum threshold amount are selected as microburst events.

20 Claims, 11 Drawing Sheets

MICROBURST DETECTION SYSTEM

FIELD OF THE INVENTION

The present invention pertains to the field of devices that use radar to detect atmospheric conditions. More specifically, the radar devices use radio emissions to identify localized wind shear events that are known as microbursts.

PROBLEM

A microburst is a type of meteorological event that is characterized by localized, low-level, and persistent horizontal and vertical wind shears. Airplanes are particularly vulnerable to the affect of a microburst. For example, an airplane might fall several hundred feet when passing through a microburst, or the pilot could encounter severe difficulty in steering the airplane. Microburst dangers are particularly acute in regions that are close to airports where airplanes travel close to the ground. Microbursts are suspected to contribute to a number of airplane crashes every year. The actual number of crashes that are caused by microbursts each year remains unknown because of the transitory, undetected nature of the microburst. Microbursts are often defined in terms of a wind shear of at least 0.0025/second, i.e., a wind speed difference of ten meters per second over a distance no greater than four kilometers.

A significant problem exists in locating microburst events because they are often invisible to the naked eye. Other wind shear events include tornadoes and storm gust fronts, but these are more easily avoided because they can be seen with the naked eye. Microbursts are associated with different types of meteorological events and commonly arise in regions where thunderstorm activity exists. Microburst detection requires the use of instrumentation to expand the range of human perception.

Conventional microburst detection relies upon processes that are similar to the Terminal Doppler Weather Radar ("TDWR") method. The TDWR method measures wind speed loss, which is different from wind shear. Thus, the TDWR lacks a direct connection to F-factors, which are well known aircraft safety indicators that require wind shear data in their computation. The TDWR method identifies interesting regions having high wind speed loss indicators. Shape building techniques are used to clump the interesting regions into shapes and remove spurious points. Each successive stage of the TDWR processing algorithm rejects points. The TDWR method lacks sensitivity to such conditions as low reflectivity that tend to hide microburst activity. Furthermore, the TDWR processing is a very complex comparison that requires a very large number of adjustable parameters. Apparatus that incorporates the TDWR process is, accordingly, very difficult to tune for accuracy in different localities. Where the TDWR method provides a false microburst indication, aircraft may be needlessly rerouted. On the other hand, failure to detect microburst activity can expose aircraft to needless risks.

There remains a true need for an improved microburst detection apparatus.

SOLUTION

The microburst detection system of the present invention utilizes mathematical modeling, fuzzy logic, and pattern recognition techniques to identify microburst activity more precisely than the existing systems outlined above. The accuracy of the present microburst detection system is realized by considering all available atmospheric and/or meteorological information before reaching a decision as to whether a point or points should be rejected as uninteresting relative to the likelihood of microburst activity. Basing microburst activity decisions on the consideration of all available atmospheric and/or meteorological information facilitates suppressing false microburst indicators that lead to false microburst detections by the existing systems outlined above and facilitates detecting microburst activity where a microburst would otherwise go undetected by the existing systems outlined above.

The microburst detection system of the present invention is disclosed herein using the term "image" to mean any graphical representation or map whether it is in visual, analog, or digital form. For example, an image can include a computer screen display projecting a three-dimensional image onto a two-dimensional space by coloring or shading the blocks of a two-dimensional polar coordinate grid system according to a likelihood value assigned to each block. The image also includes digital files incorporating the data that are used to create the computer screen display, wherein the third dimension likelihood value is mapped to its corresponding two-dimensional location. The term "likelihood" is hereby defined as an indicator of confidence in a certain value for the purpose to which it is being applied, and is not necessarily derived from a true probabilistic or statistical model. The term "fuzzy logic" is hereby defined as the logic of approximate reasoning used to iteratively quantify a likelihood. For example, the set of circumstantial evidence represented by a particular likelihood image can be combined with other evidence in other likelihood images in a point by point weighted summation of likelihood values at each point toward the end of quantifying a new likelihood image. The choice of weight values is driven by the expected effect of the particular likelihood field on the overall likelihood of the phenomena.

A single Doppler radar station is used to detect radar echos and produce signals that are representative of atmospheric and/or meteorological phenomena. The radar is connected to a processor that receives the representative signals for processing. The processor converts the signals into a plurality of microburst likelihood images that may include, but is not limited to, a wind field shear likelihood image, a clutter likelihood image, a reflectivity likelihood image, and recently detected microburst activity likelihood images. These images include sets of likelihood values for a radar-detected quantity, e.g., a relative wind shear value ranging from −1 to 1, which are assigned to grid block elements within a system of polar grid coordinates. The polar grid coordinates are defined as respective areal elements that are further defined by an angle of the radar beam sweep in combination with a particular emission gate spacing. The polar coordinate system is preferably the same for each likelihood image. A set of weighting factors that each correspond to a given likelihood image are used as multipliers to weight the likelihood values of their corresponding likelihood images. The weighted likelihood values from each image are summed for each element of the polar grid system, and the combined total for each element is used to produce a combined likelihood image. The combined image is, in turn, used to detect microburst activity.

In preferred embodiments, the apparatus emits radar at a resolution of up to or including five degrees per beam. Increasing the beam sweep tends to reduce the predictive qualities of a microburst detection system that includes the use of the fuzzy logic technique. The most preferred set of likelihood images includes a wind field shear likelihood image, a clutter likelihood image, and a reflectivity likelihood image. The weighting factors for these likelihood images are preferably found as having a ratio of about 9:4:2 determined as factors for wind field shear:clutter:and reflectivity.

The combined likelihood values are preferably subjected to an area delimiter test. An area delimiter is a circle having a radius ranging from one to two kilometers that is superposed over the combined likelihood image. The combined likelihood value of the grid coordinates underlying the center of the circle is replaced with the average (arithmetic mean) likelihood value that is calculated from the elements that underlie the circle. This averaging process tends to smooth the combined likelihood image by distinguishing those regions having high likelihoods of a greater areal extent than the area delimiter, and by normalizing downward those regions having a spuriously high likelihood of lesser areal extent than a true microburst. Microburst activity regions are then identified as shapes having contiguous or continuously connected areas that exceed a minimum threshold of averaged combined likelihood value.

DETAILED DESCRIPTION OF THE PREFERRED EMBODIMENT

Figure 1:
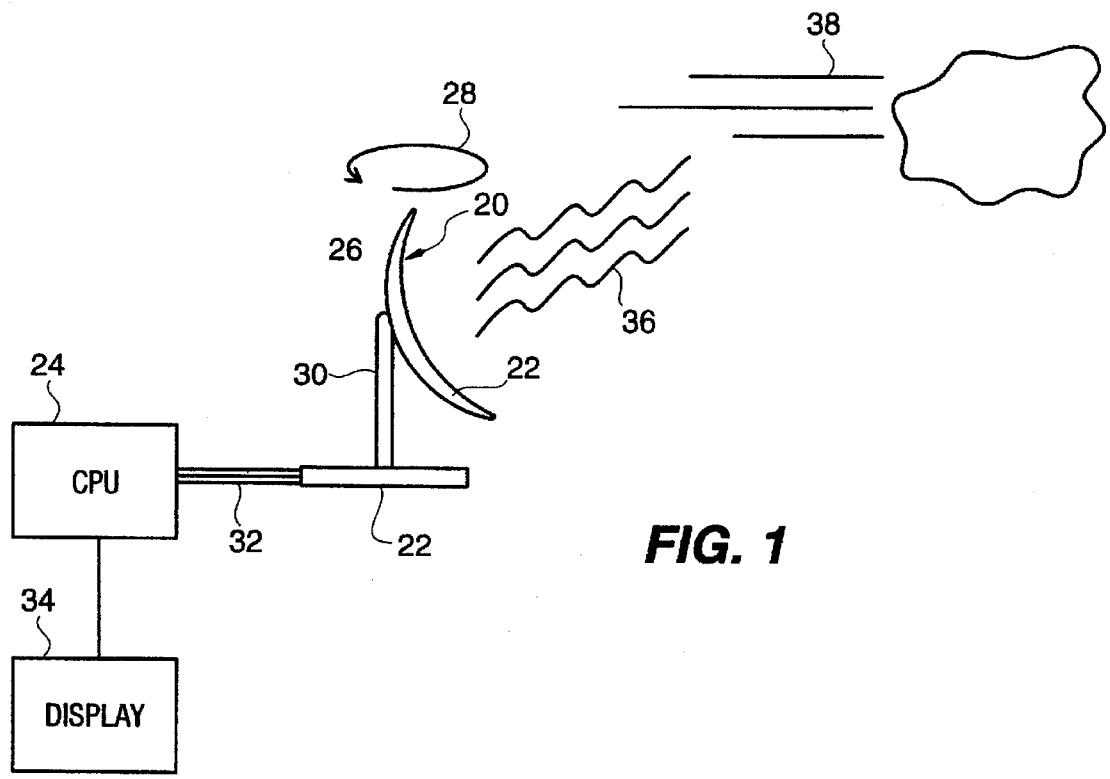
FIG. 1 depicts a radar station having a central processing unit configured according to the present invention.

FIG. 1 depicts a fuzzy logic microburst detection apparatus 20 having radar system 22 and a processing unit 24. Radar system 22 is a conventional radar emitting and detection system including antenna 26 which is continuously rotated along the arrow indicating pathway 28 by drive mechanism 30. The basic operation of radar systems like radar system 22 is well known in the art, and need not be further discussed here. Radar system 22 is preferably a TDWR device. Exemplary radar systems may be purchased from any number of commercial suppliers, such as Raytheon, Hughes Aircraft of Culver City, Calif., or other commercial manufacturers.

Processing unit 24 is operably connected with radar system 22 by communication leads 32. Processing unit 24 can be configured to vary the beam width and gate sweep of radar system 22 because processing unit 24 governs the operation of radar system 22. Processing unit 24 is programmed with a special fuzzy logic processing code according to the present invention. This processing code or technique is discussed in more detail below. Processing unit 24 is connected to display 34 for the graphical presentation of radar-derived information. Processing unit 24 is preferable provided with program modifications that enable processing unit 24 to conduct radar measurements with selectively varied azimuthal beam widths and gate spacings. The azimuth and gate spacing changes serve to vary the resolution of the microburst detection apparatus 20.

In operation, radar system 22 emits radio signals 36 and, in turn, receives corresponding reflected signals 38 that represent atmospheric conditions, e.g., microburst events and storm activity. The reflected signals are received at antenna 26, converted to electrical pulses or signals that represent the reflected signals 38, and transferred to processing unit 24 along communication leads 32. Processing unit 24 operates in a conventional manner to produce a radial wind velocity image.

Figure 2:
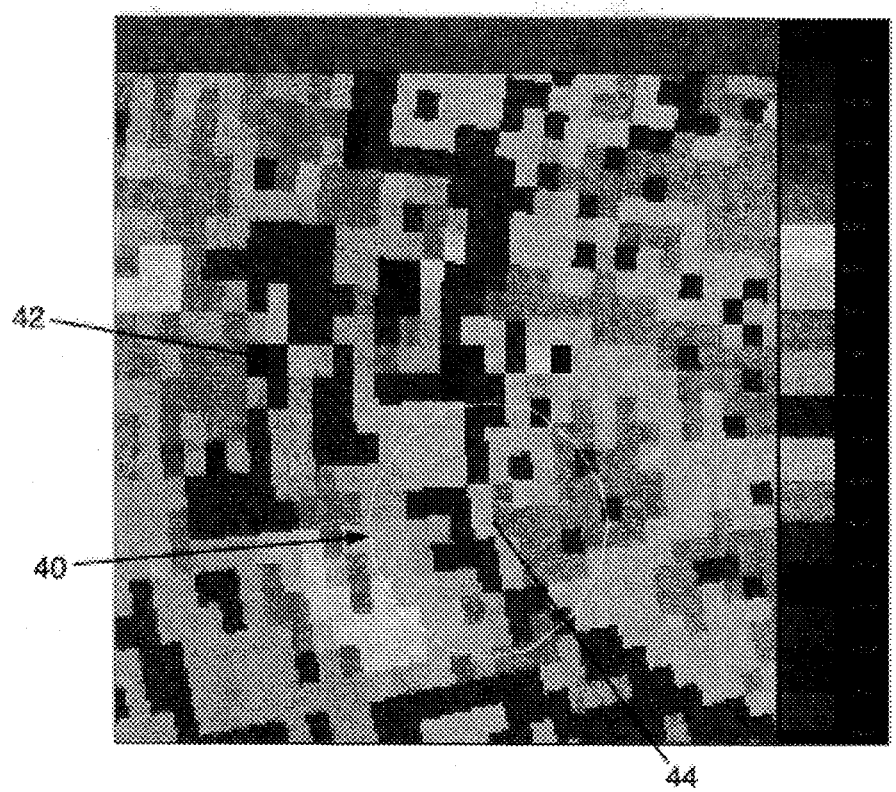
FIG. 2 depicts a plot of radar-derived wind velocity measurements displayed over a spatial grid defined by a polar coordinate system over the earth's surface, with a circle overlay indicating a human interpretation of this data to identify a microburst event.

FIG. 2 depicts a conventional radar-derived radial velocity image covering a region that includes a known microburst within circle 40. The radar screen illustrated in FIG. 2 is divided into a plurality of segments by a polar coordinate rectilinear grid where each segment is a "grid block element." The presence of a microburst is not readily apparent from the radial velocity data, but is indicated within circle 40 which indicates the results of expert human interpretation of the radial velocity data. The shaded scale of FIG. 2 indicates a positive radially oriented velocity toward the radar antenna 26 and a negative radially oriented velocity away from the radar antenna 26 in meters per second. The microburst region indicated by circle 40 includes both positive and negative radial velocities. The shaded grid block elements (e.g., element 42) have an areal extent that is defined by the azimuthal beam width and gate sweep distance governing the operation of radar system 22.

Automated Analysis of Received Signals

Figure 3:
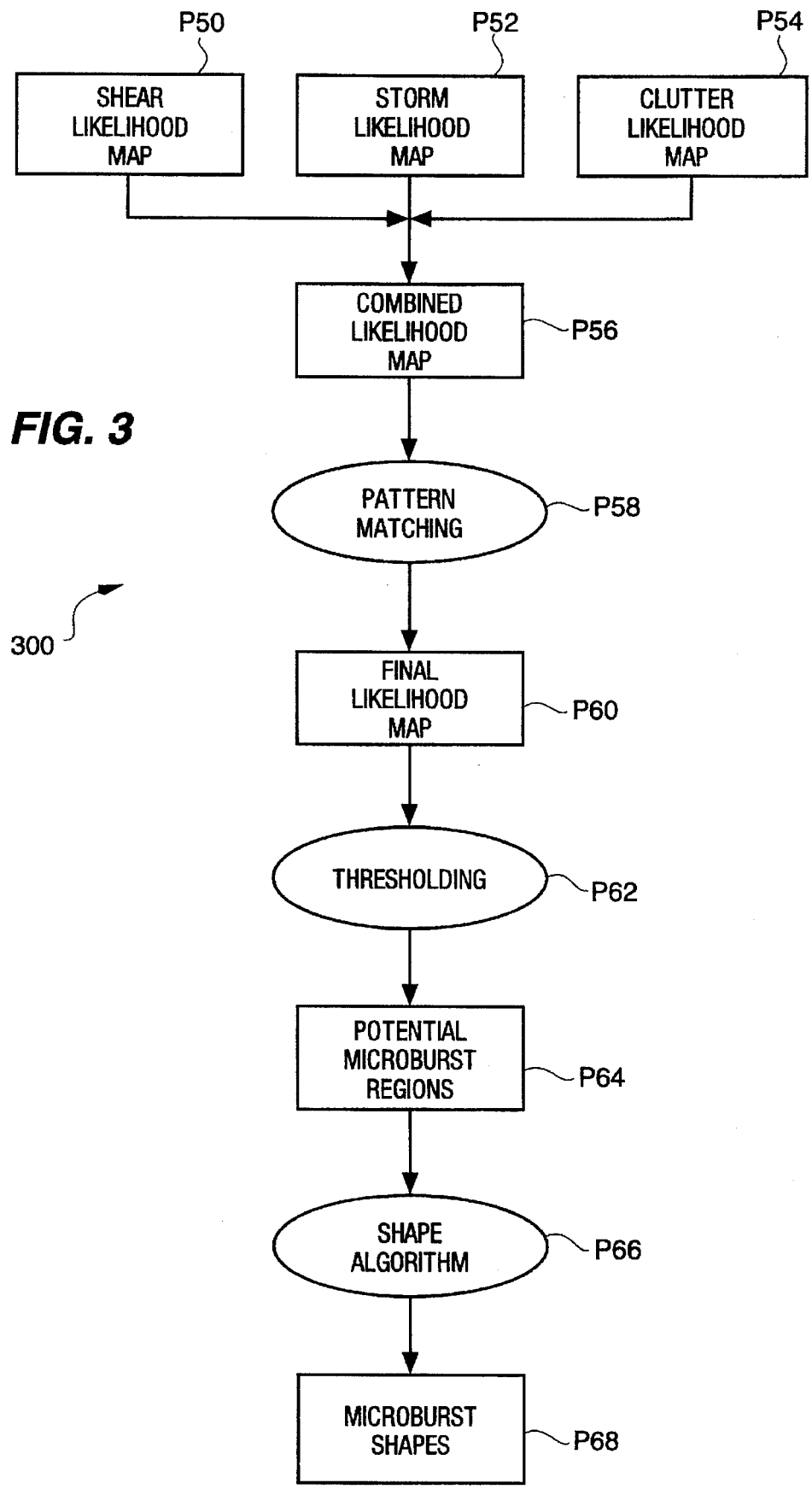
FIG. 3 depicts a schematic process flow chart for fuzzy logic processing to detect microburst events according to the present invention.

According to the present invention, processing unit 24 is improved by the addition of program control instructions to analyze the radar input. FIG. 3 depicts the processing steps used to enhance the microburst detection sensitivity and specificity of microburst detection apparatus 20.

Step P50 includes converting the radial velocity image of the reflected signals 38 shown in FIG. 2 into a wind field shear likelihood image which indicates the likelihood of microburst activity based on the presence of wind shear. Wind shear locations are apparent as areas of radial velocity divergence or convergence in the radial velocity of the wind field. Estimates of the wind field shear are often proportional to the likelihood of a microburst. Radial wind velocity is a scalar function $u(r,\theta)$ determined at a distance r from the radar antenna 26 and at an angle $\theta$. The resolution of the radar measurements forces averaging of measured quantities across the individual grid block elements (e.g., element 42 of FIG. 2) of a polar coordinate grid.

The wind field shear estimate at each grid block element is determined from the radial velocity image values using a mathematical estimation. The wind shear estimate is preferably computed using a first order least squares fit to a two dimensional local linear wind model at each grid block element point. Example 1 below provides a calculation method for determining the wind field shear estimates.

Figure 4:
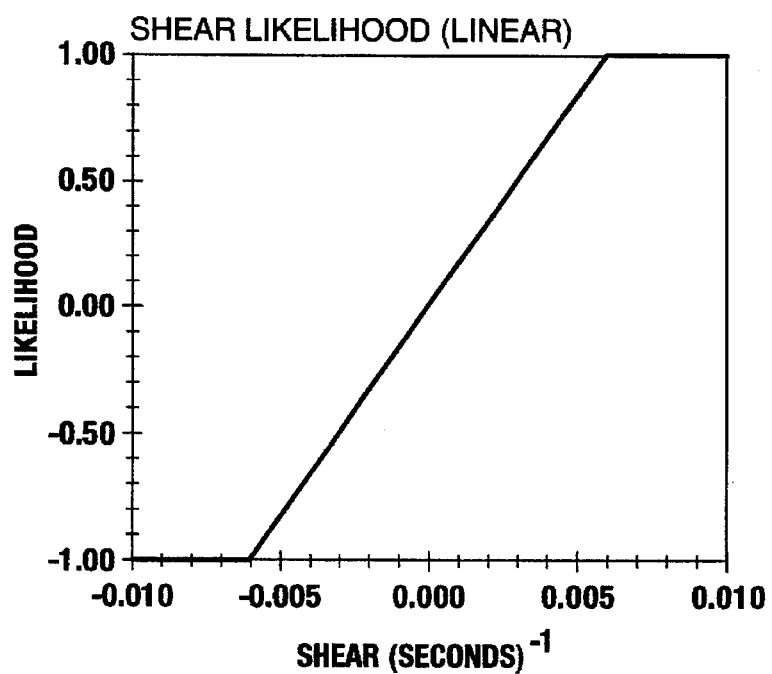
FIG. 4 depicts a wind shear likelihood mapping function for use in converting wind shear estimates derived from the velocity measurements of FIG. 2 into a wind shear likelihood map.

The wind field shear estimates at each grid block element are transformed to a likelihood of a microburst based on the wind shear value alone. FIG. 4 depicts a wind field shear likelihood function, i.e., a relationship between the wind field shear estimates and the likelihood of a microburst. The y-axis arbitrarily ranges from $-1$ to $1$ as a likelihood of microburst activity. The X-axis represents the wind shear estimate. The wind shear likelihood function is preferably a bounded piece-wise linear transformation that transforms a shear of 0.0045/s to a likelihood of 0.75, and which transforms a shear of 0.0 to a likelihood of 0.0. The selection of a preferred likelihood function is guided by the knowledge that a shear of at least 0.0025/s meets the definition of a weak microburst, and a shear of at least 0.005/s is commonly measured in microburst regions that pose hazards to aviation.

An estimate of wind field shear is computed for each grid block element (e.g., element 42 of FIG. 2) from the velocities in the region proximate to the grid block element. The calculated wind field shear values are preferably applied to the FIG. 4 likelihood function, which is used to transform the wind field shear values into corresponding likelihood values ranging between $-1$ and $1$. The resultant likelihood values are plotted to produce a wind field shear likelihood image like that illustrated in FIG. 5.

Figure 5:
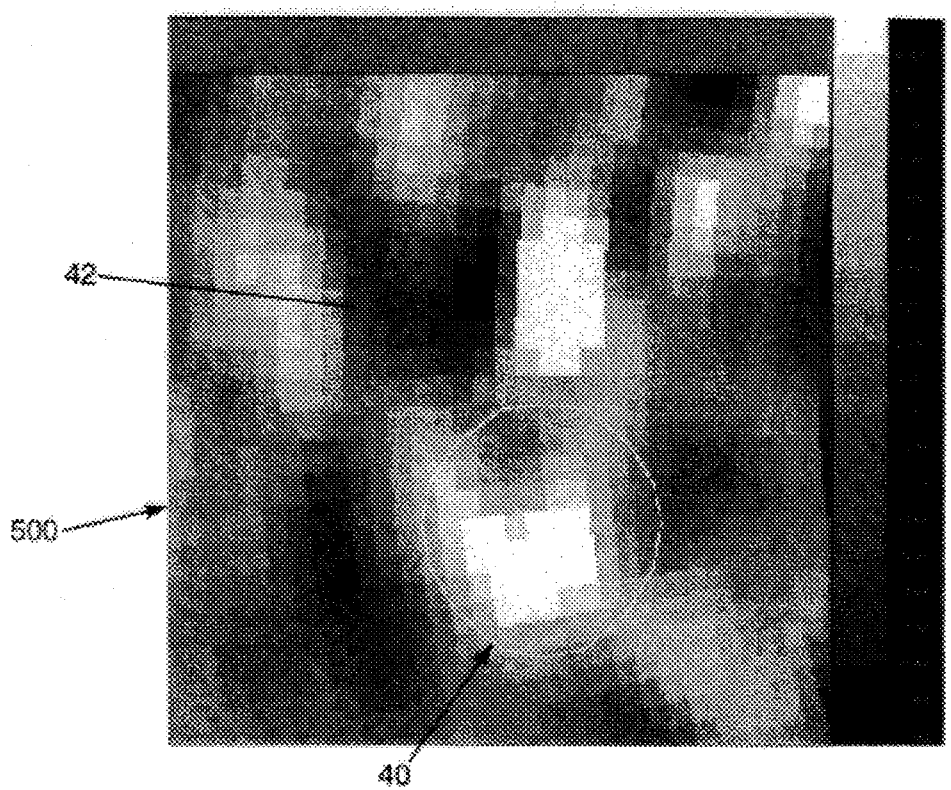
FIG. 5 depicts a wind shear likelihood image including likelihood values derived from the FIG. 4 likelihood function and the FIG. 2 velocity information.

FIG. 5 depicts a wind shear likelihood image representing the wind shear estimates from FIG. 2 after transformation by the wind field shear likelihood function of FIG. 4. The polar coordinate grid systems of each of FIGS. 2 and 5 are identical to one another. In FIG. 5, circle 40 indicates the location of a human expert's determination of a microburst location. High wind shear microburst regions are found interior to this circle, however, other bright regions above circle 40 are false indicators of microburst activity.

EXAMPLE 1

Wind Field Shear Estimation

Wind velocity data used in this example includes stored wind velocity data that originated from the Mile High Radar from a conventional single source TDWR radar operating in the Denver, Colo. area. The data selected for this example includes Mile High Radar scans obtained from Jun. 8, 1992 to Aug. 15, 1992.

A local least squares fit to a two dimensional linear wind field model is preferred for the generation of the shear estimates because it includes azimuthal shear estimates and tends to give smoother estimates that, in comparison to other calculation methods, are less sensitive to localized outlines in the data. The less preferred shear likelihood calculation methods included centered derivatives taken along the radial, and least squares taken along the radial.

The wind radial velocity function $u(r,\theta)$ is a scalar function because it is the radially oriented component of the total horizontal wind. The gradient $(u_x, u_y)$ is computed (in terms of polar coordinates) because it provides the largest rate of change in any direction at the point $(r,\theta)$. A three by five median filter or moving average is applied to the velocity data to smooth it prior to the wind shear computation. Thus, the original velocity assigned to a single block or element 42 in the polar grid is replaced by the mean of the original radial velocity data from surrounding blocks. The surrounding grid block elements include a total of three azimuthal scans (one on either side of the block for which an average was being obtained) and five spacing gates (two on either side of the block for which an average was being obtained).

Least square estimates have a long history in the mathematical and statistics literature, and have previously been used to calculate wind shear estimates from radar velocity data. It is well known in this type of calculation that increasing the number of points being sampled for the calculation reduces the uncertainty or variance in the calculation. The prior usage of least squares processing to obtain wind shear estimates, however, used data that was taken along a single radial vector. Thus, prior attempts to reduce variance in the least squares calculation emphasized the data from sequential grid block elements along a radial direction out to relatively large distances from the point of measurement, and ignored data from relatively closer grid block elements to the side of the point of measurement. The prior approach seemed logical because the velocity being calculated was a radial velocity. Nevertheless, the need to reduce uncertainty in the prior manner required selecting data from grid block elements that were in different wind shear patterns along the radial vector at positions far removed from the point of measurement.

The present technique avoids the use of increasingly remote data to reduce uncertainty in the least squares estimate. A variable $s=r\alpha$ is used to indicate a positional change where $\alpha$ is a signed angle measured from the reference line $\theta$ in a positive clockwise direction. A function $u_s$ is the partial derivative of u with respect to s, i.e., a lateral (as opposed to radial) velocity component. The largest rate of change in the velocity field in any direction at $(r,\theta)$ is therefore given by:

$$(u_r^2 + u_s^2)^{1/2} \tag{1}$$

The original Mile High Radar velocity data came from regular intervals of $\Delta r=125$ meters and $\Delta\theta=1°$, which facilitated fast computations according to a model of the form $$\bar{u}(r,s) = u_o + u_r(r - r_o) + u_s s \tag{2}$$

wherein $u-(r,s)$ is the modeled velocity at point s; $u_o$ was the velocity at $(r_o, \theta)$; and the other variables are defined above.

The model according to Formula (2) forms the basis for a quadratic equation $$R = \sum_{\substack{i=-N \\ j=-M}}^{\substack{N \\ M}} (u(r_j, s_{ij}) - \bar{u}(r_i, s_{ij})^2 w_{ij}), \tag{3}$$

wherein the subscripts i and j denote values from the point $(r_i, \theta_j)$ in a summation data field data ranging from $i=-N$ to N and $j=-M$ to M; and w is a weighting factor with $w_{ij}>0$, $w_{-ij}=w_{ij}$, and $w_{i,-j}=w_{ij}$ for all i and j. The normal equations for a least squares solution existed as $$\frac{\partial R}{\partial u_r} = \frac{\partial R}{\partial u_s} = \frac{\partial R}{\partial u_o} = 0. \tag{4}$$

The weighting factors $w_{ij}$ are all set to 1.0, however, it was possible to adjust the weighting factors to vary the significance of data depending upon the distance from the point of measurement $(r_o, \theta)$ and the data point being used for the least squares calculation.

The model is minimized as a simple diagonal system according to the equations $$u_r = \frac{\sum_{\substack{i=-N \\ j=-M}}^{\substack{N \\ M}} i u_{ij} w_{ij}}{\Delta r \Sigma i^2 w_{ij}} \tag{5}$$

$$u_s = \frac{\sum_{\substack{i=-N \\ j=-M}}^{\substack{N \\ M}} \Delta s_{ij} u_{ij} w_{ij}}{(\Delta s_{ij})_2 w_{ij}} \tag{6}$$

$$u_o = \frac{\sum_{\substack{i=-N \\ j=-M}}^{\substack{N \\ M}} u_{ij} w_{ij}}{\Sigma w_{ij}} \tag{7}$$

The quantity $u_r$ is then the shear estimate at point $(r_o, \theta)$ which was used to transform the velocity data through the likelihood function of FIG. 4.

In FIG. 3, step P52 includes the production of a storm likelihood image. Microbursts have an increased likelihood of occurrence in connection with storm fronts, even though it is possible to observe a dry microburst that is not associated with storm activity. Storm activity is associated with high radar reflectivity.

Figure 6:
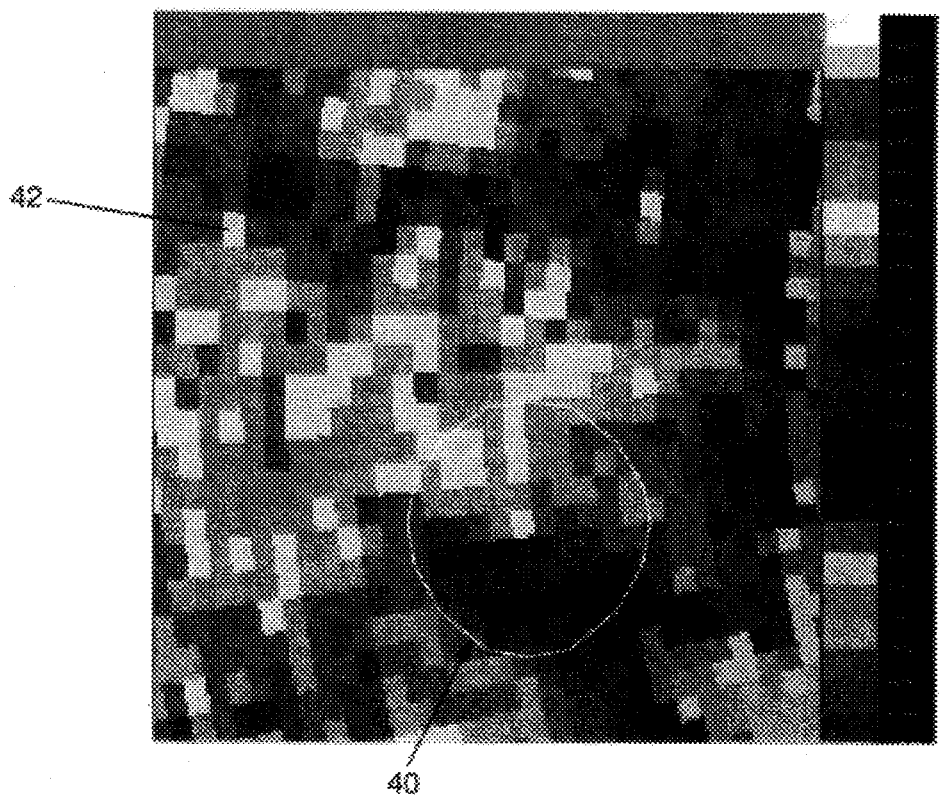
FIG. 6 depicts a radar-derived reflectivity image for the polar grid system of FIG. 2.
Figure 7:
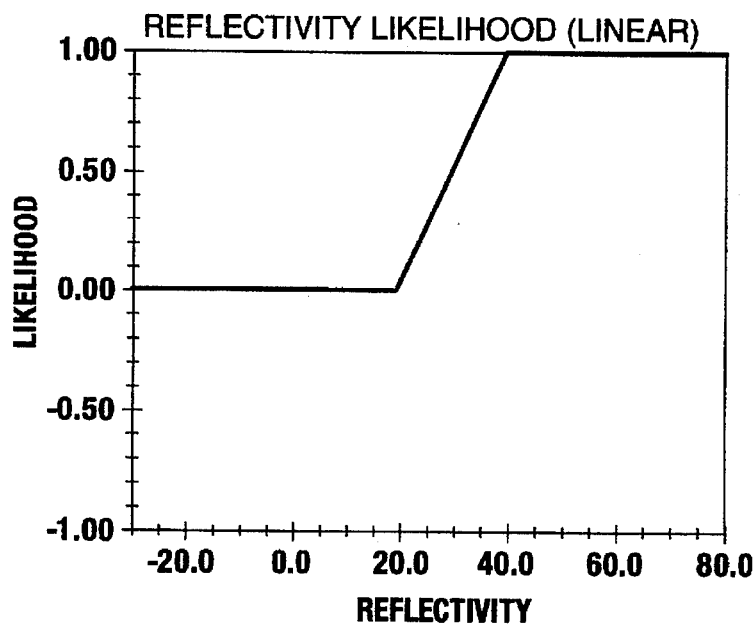
FIG. 7 depicts a reflectivity likelihood mapping function for use in assigning likelihood values to the FIG. 6 reflectivity measurements.

FIG. 6 depicts a radar reflectivity image obtained over the same polar grid coordinates (e.g., element 42) as FIGS. 2 and 5. The conventional reflectivity image is an indicator of storm activity, which is associated with an increased likelihood of microburst activity. The storm likelihood is, accordingly, defined as a bounded piece-wise linear function of local surface reflectivity. FIG. 7 depicts a reflectivity likelihood mapping function of this type. The Y-axis is a storm likelihood that arbitrarily ranges from −1 to 1. The X-axis is a reflectivity in dBZ. The mapping function is zero for all values less than a reflectivity of 20, rises linearly to a likelihood of 1 at a reflectivity of 40, and is 1 for all reflectivity values greater than 40.

Figure 8:
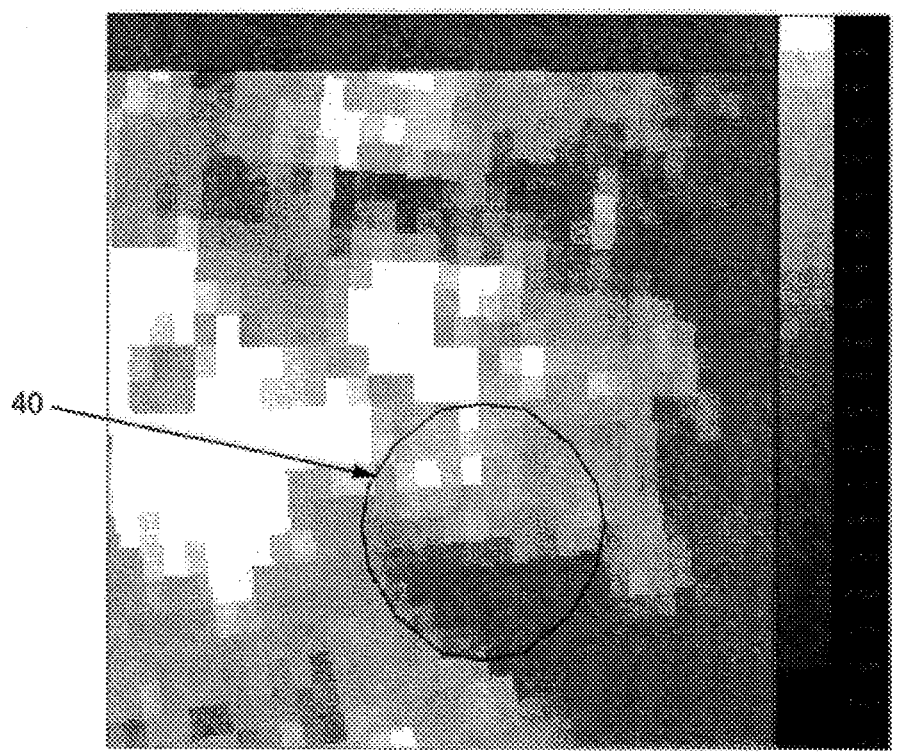
FIG. 8 depicts a reflectivity likelihood image that was obtained by applying the FIG. 7 likelihood function to the FIG. 6 reflectivity measurements.

FIG. 8 depicts a reflectivity likelihood image that was obtained by transforming the reflectivity values of FIG. 6 through the mapping function of FIG. 7. The reflectivity likelihood image of FIG. 8 is an indicator of storm activity. The presence of microburst activity is not clearly indicated by the portion of FIG. 8 within circle 40.

Clutter Likelihood Image

Step P54 includes producing a clutter likelihood image. The fact that fixed objects influence radar wind shear measurements is a well known problem in the art. For example, fixed objects having a measured wind speed of zero can be embedded in an ambient wind field that can produce wind shear which is not caused by a meteorological event. These false measurements can lead to faulty microburst detection, i.e., false alarms. Methods of producing clutter images are well known in the art. An exemplary method of producing a clutter image is described in Mann, D. R. "TDWR Clutter Residue Map Generation and Usage" MIT Lincoln Laboratory, Project Report ATC-148, DOT/FAA/PM-87/26, January, 1988. The foothills to the west of Denver Colo. obstruct the Mile High Radar with a great deal of clutter.

The presence of clutter on the image is indicated as a binary yes or no value for each grid position such as grid block element 42. A clutter likelihood function is used to generate a clutter likelihood image from the binary position indicators as a function of distance. Measurements that are obtained far from clutter have a zero likelihood of being influenced by clutter. Similarly, measurements that are obtained close to clutter have a very high likelihood of being influenced by clutter. Thus, a clutter-influenced shear rate should be suppressed unless other indicators confirm the presence of a microburst.

Figure 9:
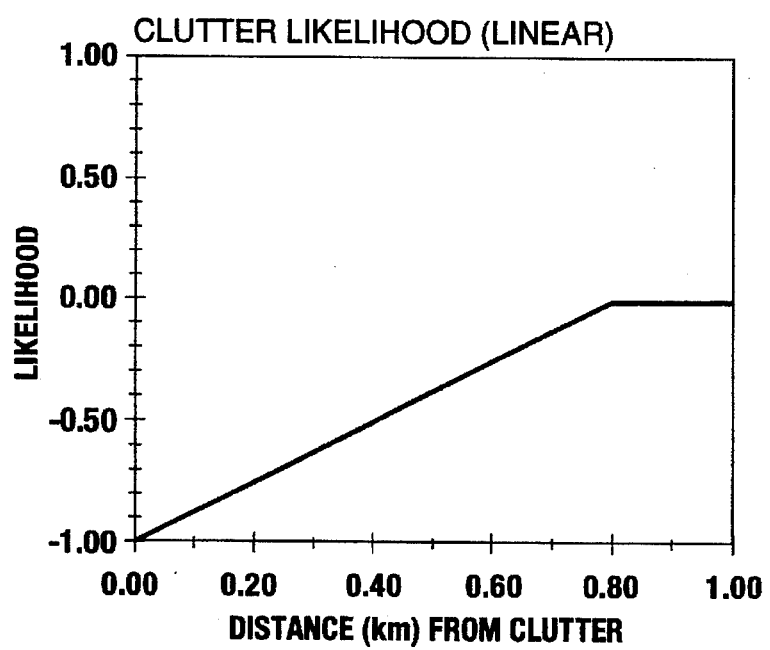
FIG. 9 depicts a clutter likelihood function.
Figure 10:
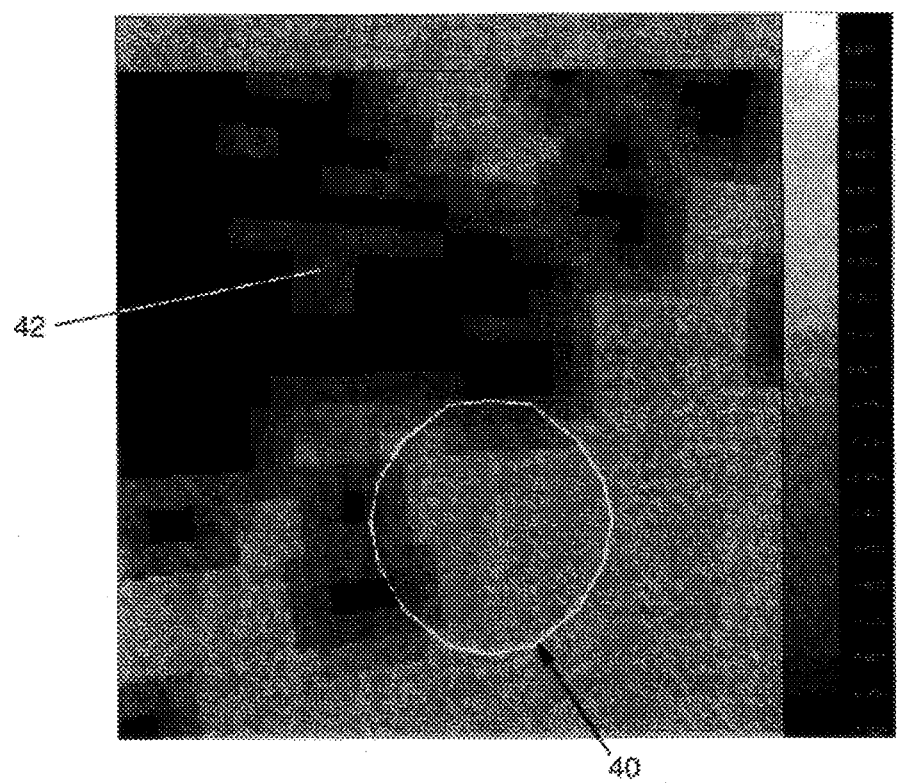
FIG. 10 depicts a clutter likelihood image that was obtained by applying the FIG. 9 function to a standard area clutter image for a portion of the area surrounding Denver, Colo.

FIG. 9 depicts a clutter likelihood function. The microburst likelihood is −1 at a distance 0 km from the closest known clutter location, and rises to a likelihood of 0 at 0.8 km from the closest known clutter location. The 0.8 km value can be varied to optimize results, but a value of 0.8 km is most preferred. FIG. 10 depicts a clutter likelihood image for the same polar grid coordinates in the Denver metropolitan area as is shown in FIGS. 2, 5, 6, and 8. The distance between the clutter location and the point of measurement is preferably calculated using polar coordinates between the centroids of the respective radar grid positions such as element 42, or through a lookup table derived from this type of calculation.

EXAMPLE 2

Clutter Suppression

The distance D between two points $(r_1, \theta_1)$ and $(r_2, \theta_2)$ is calculated as $$D = [r_1^2 + r_2^2 - 2r_1 r_2 \cos(\theta_2 - \theta_1)]^{1/2}, \tag{8}$$

wherein $(r_1, \theta_1)$ are the polar coordinates of a point being studied by radar, and $(r_2, \theta_2)$ were the polar coordinates of a known clutter body.

Clutter grid positions were assigned a one value, with all other locations being assigned a zero value for a binary indication of clutter points. A circle 44 having a radius of 0.80 km was positioned at the end of the search radius $r_1$ according to FIG. 11. A distance to the center of the circle was calculated according to Formula 8 for all clutter points X within the circle. The distances are then sorted and ranked. The minimum distance is applied through the likelihood function of FIG. 9 to determine a clutter likelihood value for the grid position. If no clutter points are found to exist within the circle, the likelihood is set to a value of 0.0.

In the Denver area, which had a large amount of clutter, this calculation is very expensive in terms of computing resources. Therefore, it is preferred to compute distances for the respective grid positions and store them in a lookup table. In one example using a lookup table, the calculation time decreased from forty five seconds to four seconds.

Combined Likelihood Image

In FIG. 3, step P56 includes producing a combined likelihood image. The respective likelihood images from each of FIGS. 5, 8, and 10 are used to supply three corresponding likelihood image values for an identical set of polar coordinates including grid block elements (e.g. element 42) that are shared by all three sets of data. The likelihood values include microburst likelihood values for wind shear, reflectivity, and clutter measurements. A combined additive weighting likelihood value is obtained at each grid block element by multiplying the coordinate-specific likelihood from each set of data by a weighting factor according to Formula (9):

$$L = W_s L_s + W_c L_c + W_r L_r, \tag{9}$$

wherein L is the combined likelihood; $W_s$ is a weighting factor for the wind shear likelihood data set; $L_s$ is a coordinate-specific likelihood value for the wind shear likelihood data set; $W_c$ is a weighting factor for the clutter likelihood data set; $L_c$ is a coordinate-specific likelihood value for the clutter likelihood data set; $W_r$ is a weighting factor for the reflectivity likelihood data set; and $L_r$ is a coordinate-specific likelihood value for the reflectivity likelihood data set. The range of values for L are preferably truncated between −1 and 1.

The individual weighting factors $W_s$, $W_c$, and $W_r$ are carefully selected to optimize the incidence of L values equaling 1 and −1 in conformity with the event function t(k) according to Formula (10) below:

$$t(k) = \begin{matrix} 1 \rightarrow \text{event at } k \\ -1 \rightarrow \text{otherwise (no event)} \end{matrix} \tag{10}$$

wherein t(k) is the event function approximated by a given L likelihood with a value of 1 indicating an exact correlation to a microburst event and a value of −1 indicating an exact correlation to no microburst event; and k represents a coordinate where the event or non-event occurs. Weighting factor selection is preferably accomplished with conventional neural network training techniques, such as backward training techniques. Neural network training techniques are generally well known, and can be implemented from a variety of published articles and commercially available software. These weights can also be chosen by human experts with good performance in the model.

Figure 12:
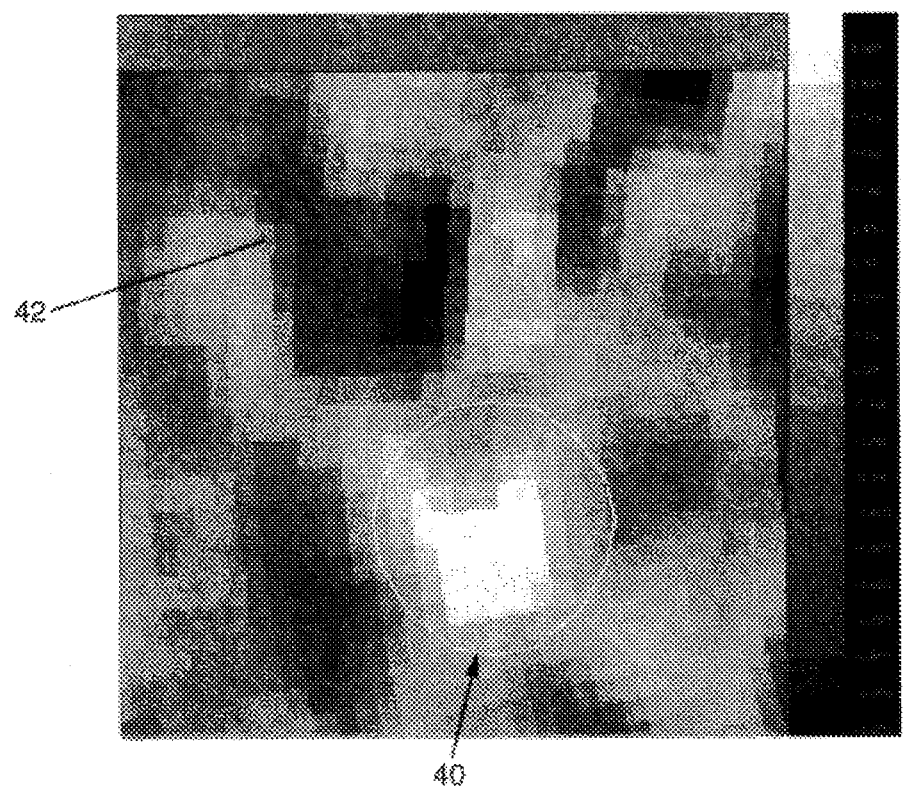
FIG. 12 depicts a combined likelihood image including the combined weighted likelihood values from FIGS. 5, 8, and 10.

In the Denver region, the optimal values for $W_s$, $W_c$, and $W_r$ have been determined as $W_s$=0.9, $W_c$=0.4, and $W_r$=0.2. FIG. 12 depicts a combined likelihood image using the Denver region weighting factors to adjust the likelihood values from FIGS. 5, 7, and 9. A high microburst activity exists within circle 40, however, bright areas of false likelihoods still exist outside of circle 40.

In step P58, the combined likelihood image of FIG. 12 is scrutinized for pattern relationships that indicate an areal extent large enough for actual microburst activity. A microburst can be represented as a superposition of circles each having a certain minimum radius. A preferred radius for each circle is 1.5 km. The center of such a circle is positioned at the center of each spatial element (e.g., grid block element 42). All of the likelihood values within the circle are averaged for grid block elements having a centroid that falls within the circle, and the average value is assigned to the grid block element that underlies the center of the circle. The circle is moved to the next element, and the process is repeated averaging the original combined likelihood values from FIG. 12 for the grid block elements within the circle at its new location until average values have been obtained for all of the grid block elements.

Figure 13:
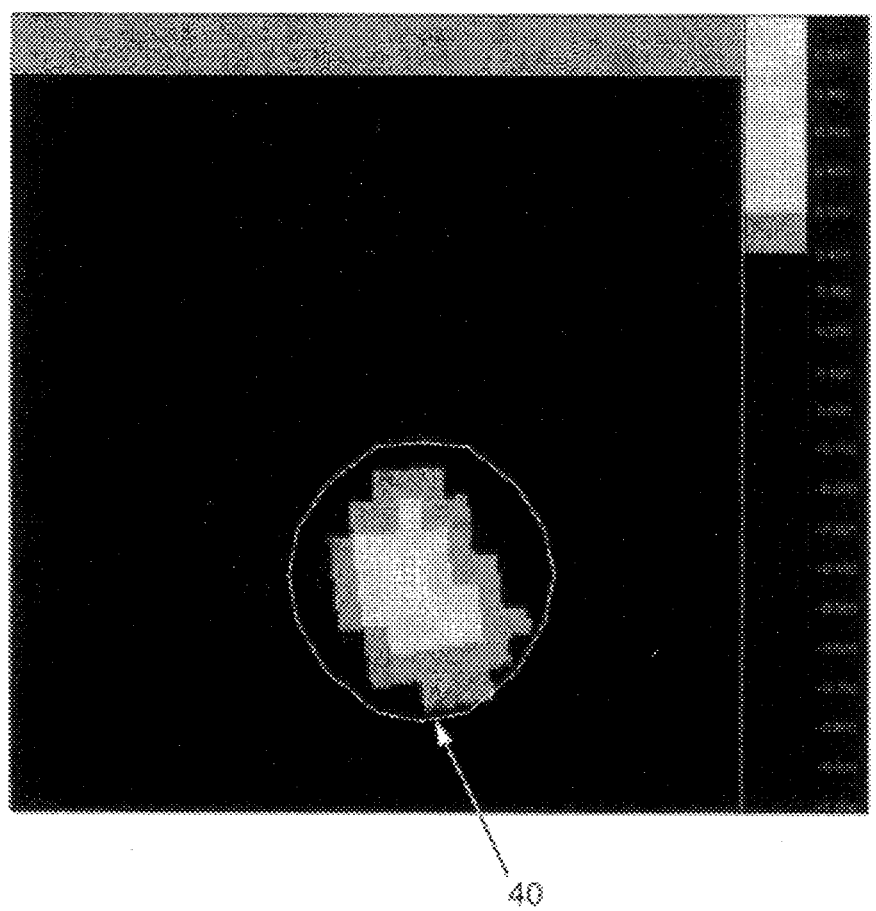
FIG. 13 depicts the FIG. 12 combined likelihood image after a pattern analysis has smoothed the data to eliminate spurious points.

In step P60, the pattern-averaged weighted calculation results (L values) are plotted a final likelihood image. FIG. 13 depicts the combined likelihood image of FIG. 12 after the pattern matching of Step P58. It is apparent from a comparison between FIGS. 12 and 13 that the pattern matching of Step P58 has smoothed the image by eliminating most of the spurious single element anomalies, while permitting the larger blocks having similar values to remain in the image. A false microburst indicator exists above circle 40 in FIG. 12, but the false indicator is not present in FIG. 13. The pattern matching also removes spurious local points that derive from fast moving targets such as aircraft.

Figure 11:
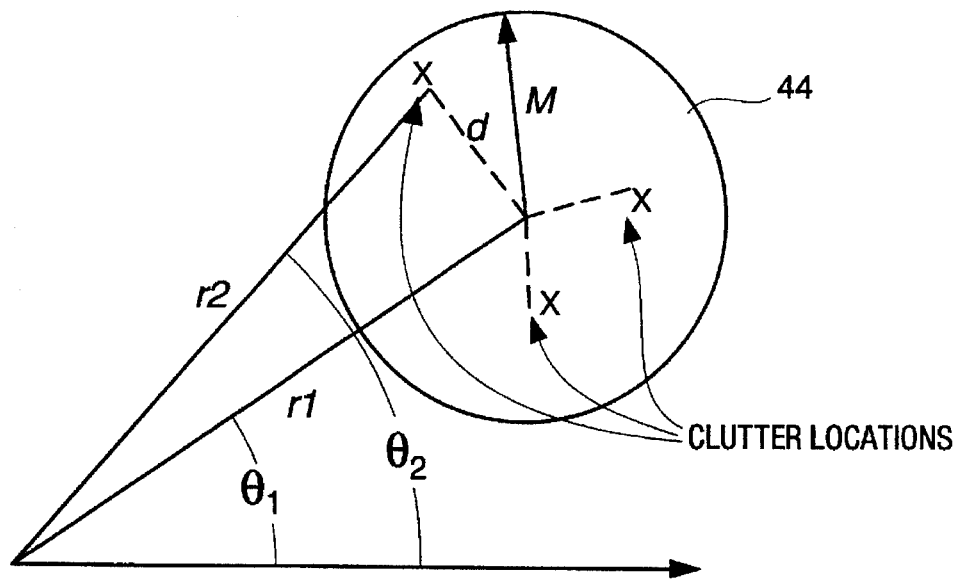
FIG. 11 depicts a method of calculating a distance between a clutter location and a point of radar measurement for a polar coordinate system.

Step P62 includes applying a threshold likelihood delimiter to determine which regions of an image like FIG. 11 are actually microbursts. After the pattern matching of Step P58, the data in the smoothed image (e.g., FIG. 13) is subjected to a clumping or aggregation analysis. A threshold likelihood value is compared to that for each of the grid coordinates on the image. The threshold value is preferably a likelihood value (L) ranging from 0.3 to 0.5 when the combined likelihood ranges from −1 to 1, and is most preferably 0.5. In Step P64, regions of continuously connected grid elements having a combined likelihood greater than the threshold are identified. Any number of such regions can exist with varying sizes. In Step P66, microburst shapes are defined as lines drawn around each connected group of elements having a likelihood value that exceed the threshold. The lines form respective polygonal closed boundaries. In Step P68, the lines or shapes can be displayed through display 34 on a velocity image as microburst indicators, e.g., shape 44 of FIG. 2. Shapes having a total area less than a minimum area delimiter are discarded as spurious readings. The area delimiter is preferably 1.5 km². Shapes having an overall radial length less than a minimum length delimiter are also discarded. The radial length delimiter is preferably 1.0 km.

EXAMPLE 3

Sensitivity To Variable Scan Resolution

An original Mile High Radar data was obtained at 225 meter range spacing and one degree azimuthal resolution, and stored for later use. The original data was resampled to lower azimuthal resolutions ranging up to five degrees to mimic the performance of radar system having lower resolutions or a variable resolution. Specifically, the data resampling was performed at a 300 meter gate spacing resolution in combination with respective 3, 4, and 5 degrees of azimuthal resolution.

The velocity resolution of the Mile High Radar data was reduced according to Formula (11):

$$V = \sum_{i=1}^{N} V_i 10^{\frac{Di}{10}}, \tag{11}$$

wherein $V_i$ is the actual measured velocity for each i over a given polar grid element in the original data adjusted in proportion to areal extent for partial areal elements; n is the number of measurements required to be combined for the desired resolution; V is the lower resolution velocity measurement; and Di is a reflectivity value in dBZ corresponding to $V_i$. Similarly, reflectivity is averaged according to Formula (12):

$$D = 10 \log \left( \frac{\sum_{i=1}^{N} 10^{\frac{Di}{10}}}{n} \right), \tag{12}$$

wherein D is the lower resolution reflectivity measurement, and the other variables have been defined above.

Table 1 below identifies the processing parameters that were applied to the respective 1, 3, 4, and 5 degree data sets according to the process steps illustrated in FIG. 3. The first column of Table 1 includes a parenthetical reference to specific process steps of FIG. 3.

TABLE 1

ADJUSTABLE PROCESS PARAMETERS

| Description Process Step | Parameter | Value |
|---|---|---|
| Data PreProcessing (P50) | Median Filter Number of Gates | 3 |
| Linear Shear Calculation (P50) | Least squares box size | 700 meters |
| (P50) | Minimum number of azimuths in least squares box | 3 degrees |
| (P50) | Maximum number of azimuths in least squares box | 45 degrees |
| Shear Likelihood Mapping (P50) | Shear at which likelihood = 0.75 | 0.0045 s-1 |
| (P50) | Shear at which likelihood = 0.0 | 0.0 s-1 |
| Clutter Likelihood Mapping (P54) | Distance at which effect of clutter disappears | 800 meters |
| Storm Likelihood Mapping (P54) | Maximum dBZ for no increase in likelihood | 20 dBZ |
| (P54) | Minimum dBZ for max increase in likelihood | 40 dBZ |
| Combining (P56) | Shear likelihood weight | 0.9 |
| (P56) | Clutter likelihood weight | 0.4 |
| (P56) | Storm likelihood weight | 0.2 |
| Pattern Matching (P58) | Pattern Circle Radius | 1.5 km |
| Shape Building (P62) | Final Likelihood Threshold | 0.5 |
| (P66) | Minimum allowed shape area | 1.5 km$^2$ |
| (P66) | Minimum allowed shape average radial extent | 1.0 km |

The respective 1, 3, 4, and 5 degree radar data sets were processed according to the process steps illustrated in FIG. 3 for the identification of microburst regions using the parameters of Table 1. Columns that include data that is obtained from the process illustrated in FIG. 3 are provided with the fuzzy logic designator "FL." The original Mile High Radar data was also subjected to TDWR analysis for comparative purposes. Additionally, a microburst interpretation expert was consulted to review ground wind speed meter information and the TDWR radar velocity images, in order to provide an expert analysis for comparative purposes. Table 2 below provides a summary of the calculation results, with the far right six columns providing a comparative count of the microburst events identified by each method.

TABLE 2

MICROBURSTS AND THEIR DETECTION BY VARIOUS PROCESSES

| Date | Start | Stop | Scans | EXPERT Events | FL 1° | FL 3° | FL 4° | FL 5° | TDWR 1° |
|---|---|---|---|---|---|---|---|---|---|
| 92/06/08 | 21:47:11 | 23:07:58 | 82 | 135 | 154 | 115 | 102 | 92 | 178 |
| 92/06/13 | 22:49:21 | 24:10:05 | 83 | 220 | 133 | 126 | 108 | 100 | 442 |
| 92/07/10 | 22:52:21 | 24:05:11 | 75 | 173 | 185 | 132 | 108 | 104 | 289 |
| 93/07/12 | 18:05:53 | 20:34:56 | 151 | 192 | 238 | 114 | 120 | 95 | 327 |
| 93/07/21 | 22:59:38 | 24:16:40 | 79 | 221 | 126 | 61 | 50 | 47 | 300 |
| 93/08/15 | 21:30:00 | 23:07:42 | 99 | 66 | 93 | 62 | 49 | 44 | 92 |

Figure 14:
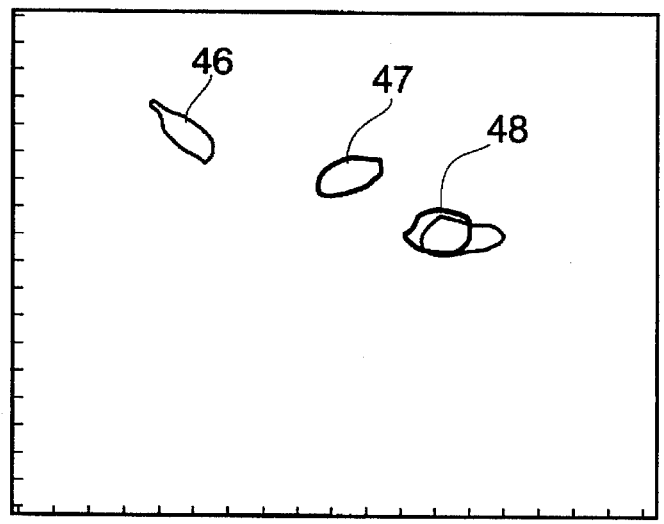
FIG. 14 depicts various microburst shapes that were indicated to be present by the FIG. 3 process, and compares these shapes to microburst events that were identified by a human microburst identification expert.

FIG. 14 depicts an exemplary analysis of various microburst events that were identified in a region by the expert (bold lines) and the one degree resolution FL processing according to the process steps illustrated in FIG. 3 (thin lines). FIG. 14 indicates a false detection 46, a missed event 47, and agreement or a hit at area 48 between the expert and the microburst detection system. Statistical results for the respective resolutions were calculated according to the formulae:

$$POD = \frac{\Sigma \text{ hits}}{\Sigma \text{ events}} \quad (13)$$

$$FAR = \frac{\Sigma \text{ false detections}}{(\Sigma \text{ false detections} + \Sigma \text{ hits})} \quad (14)$$

$$CSI = \frac{\Sigma \text{ hits}}{(\Sigma \text{ false detections} + \Sigma \text{ hits} + \Sigma \text{ missed detections})}, \quad (15)$$

wherein POD was the probability of detecting a microburst event; FAR was the false alarm rate; and CSI was the critical success index.

Table 3 below provides a computation for results out to 30 km from the radar, and Table 4 provides results out to 15 km from the radar.

TABLE 3

RESULTS OUT TO 30 KM FROM THE RADAR

| Degrees per beam | Gate Spacing (meters) | Algorithm | POD | FAR | CSI |
|---|---|---|---|---|---|
| 1 | 225 | TDWR | 0.70 | 0.20 | 0.60 |
| 1 | 225 | FL | 0.76 | 0.20 | 0.64 |
| 3 | 300 | FL | 0.68 | 0.13 | 0.61 |
| 4 | 300 | FL | 0.68 | 0.14 | 0.61 |
| 5 | 300 | FL | 0.58 | 0.11 | 0.54 |

TABLE 4

RESULTS OUT TO 15 KM FROM THE RADAR

| Degrees per beam | Gate Spacing (meters) | Algorithm | POD | FAR | CSI |
|---|---|---|---|---|---|
| 1 | 225 | TDWR | 0.73 | 0.19 | 0.63 |
| 1 | 225 | FL | 0.75 | 0.14 | 0.67 |
| 3 | 300 | FL | 0.71 | 0.11 | 0.64 |
| 4 | 300 | FL | 0.69 | 0.09 | 0.64 |
| 5 | 300 | FL | 0.66 | 0.11 | 0.61 |

Figure 15:
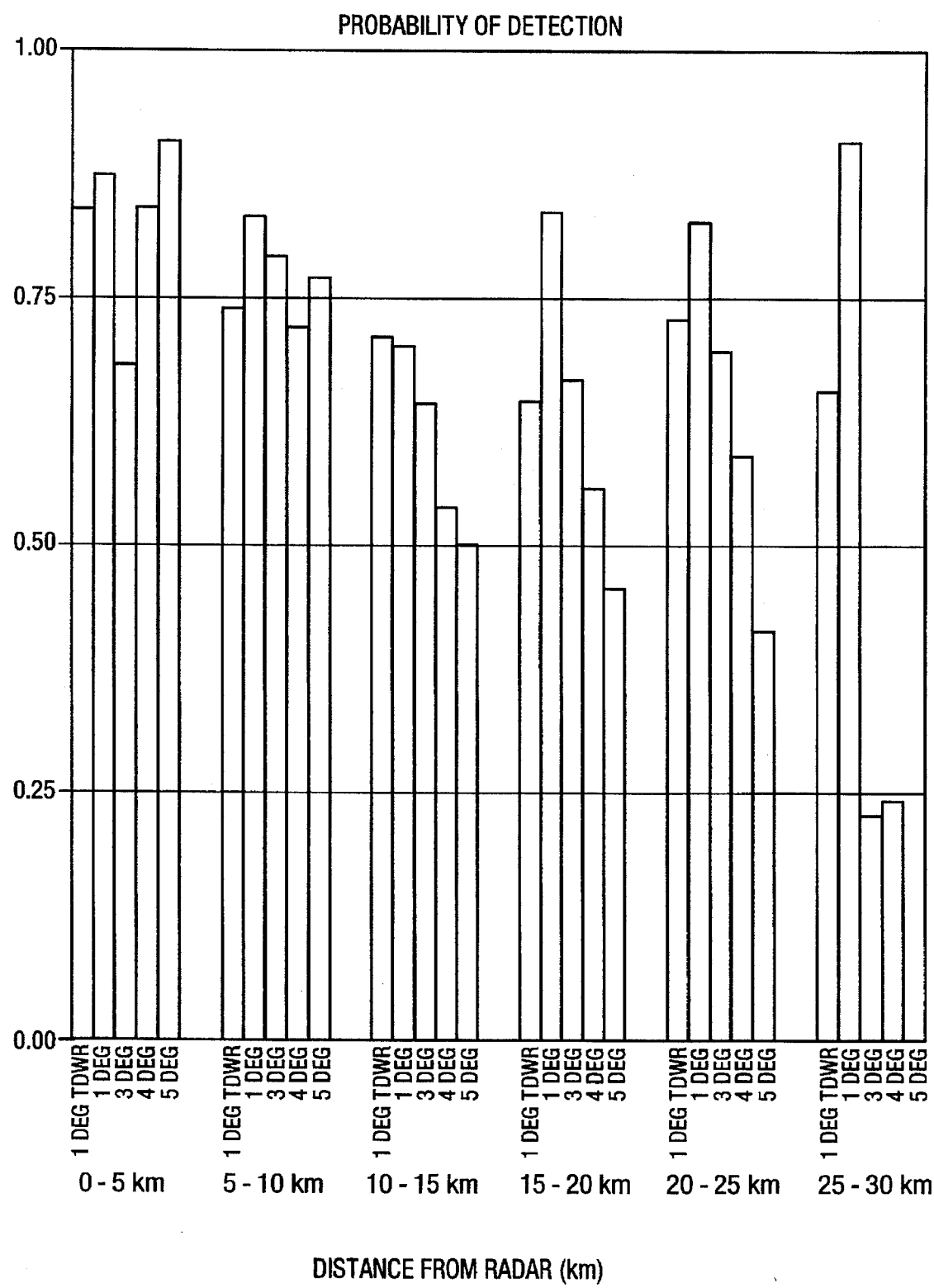
FIG. 15 depicts a bar graph providing a comparison of the probability of microburst detection at various distances from the radar for different analysis techniques and resolutions.

FIG. 15 is a bar graph depicting the POD results at various distances between zero and 30 km from the radar. In general, the microburst detection system of the present invention provided a higher level of detection than did the TDWR method, and the relative accuracy of the microburst detection system became increasingly more accurate as the distance from the radar increased. Accuracy of the microburst detection system generally decreased with scan resolution, however, accuracy at a 5 degree scan resolution was actually enhanced at distances out to 5 km.

Figure 16:
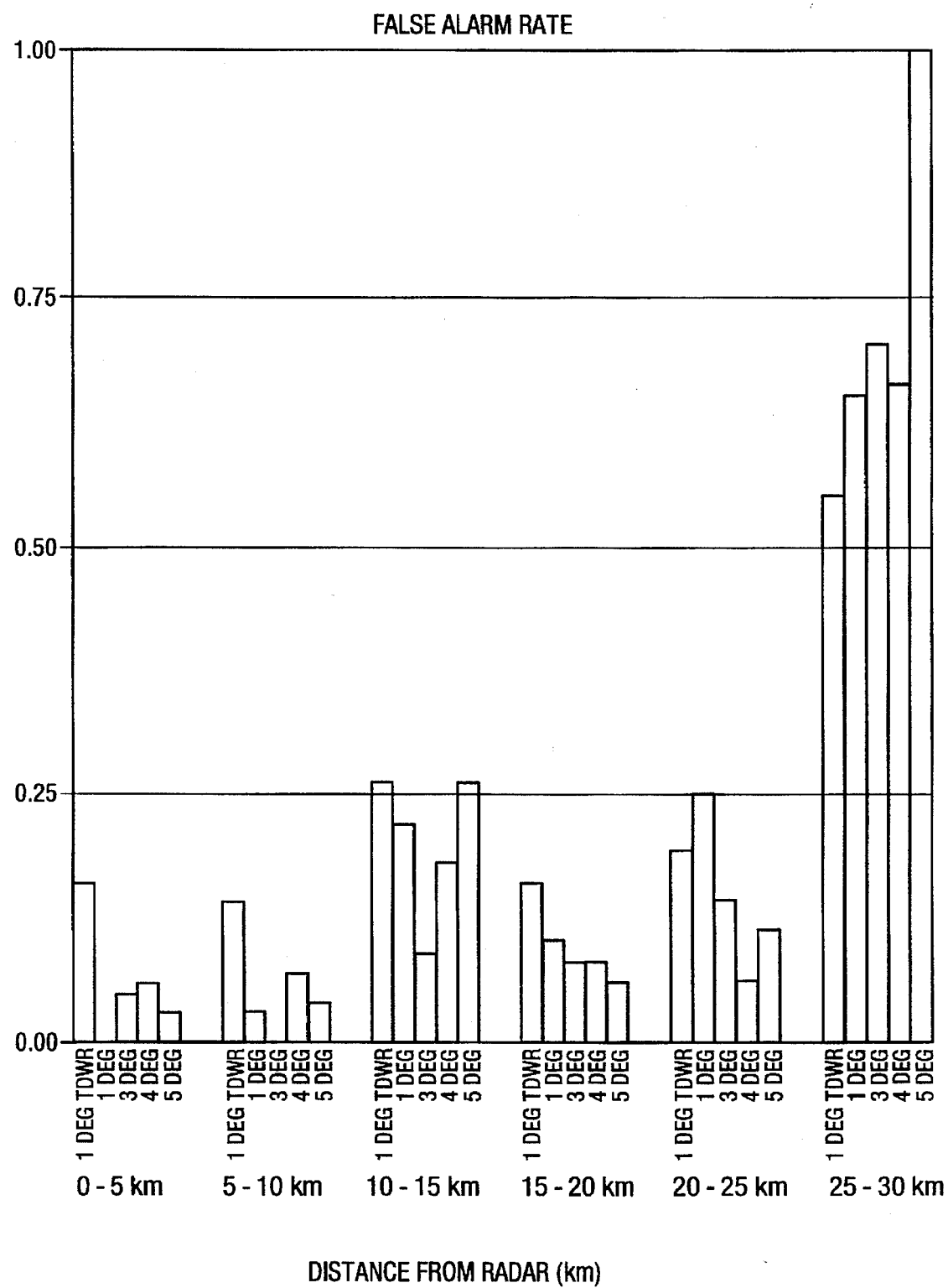
FIG. 16 depicts a comparative graph like that of FIG. 15, but provides a comparison of the false alarm rate for the respective analysis techniques and resolutions.
Figure 17:
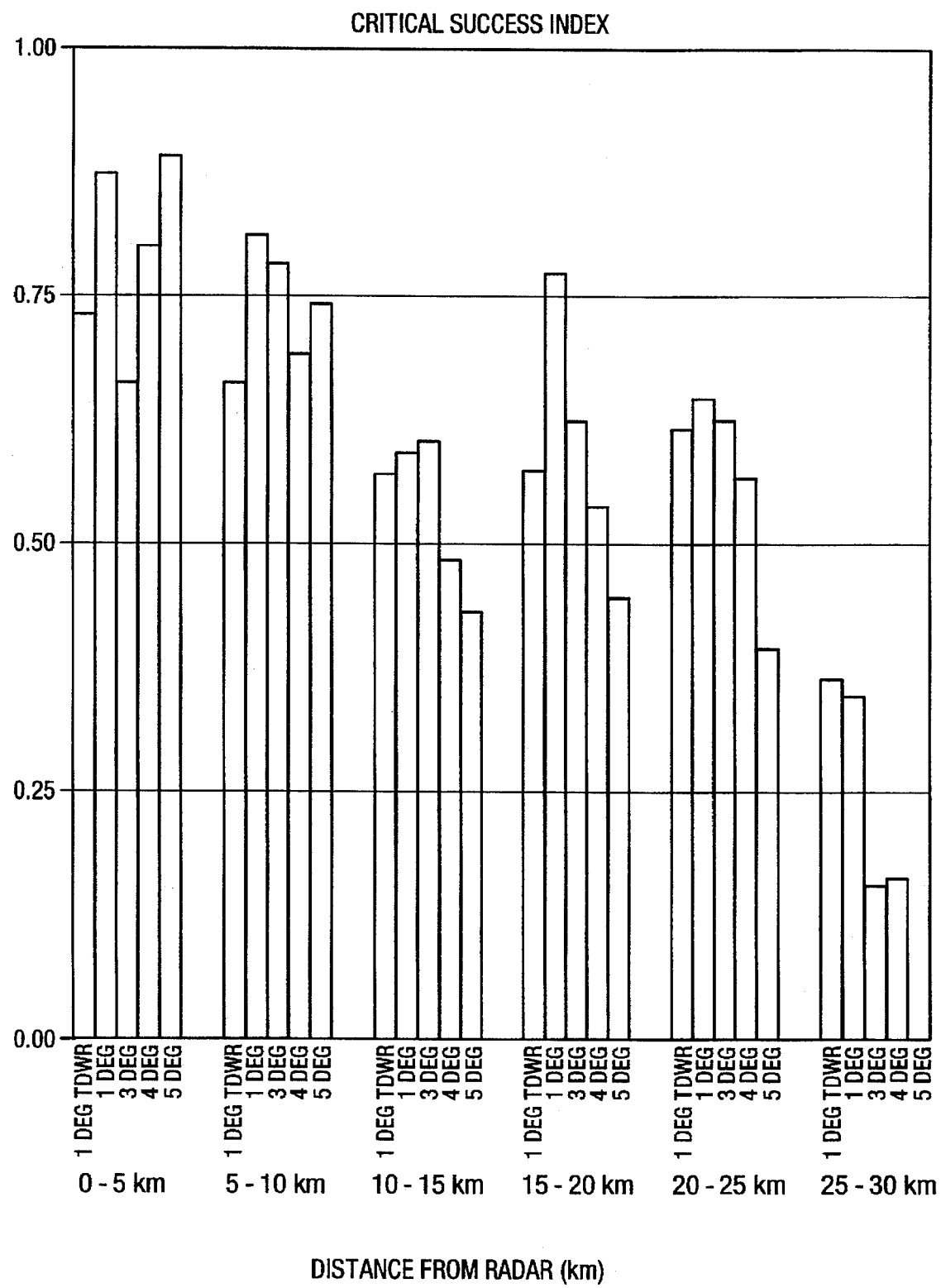
FIG. 17 depicts a plot like that of FIG. 15, but provides a comparison of critical success index statistics for the respective analysis techniques and resolutions.

FIG. 16 is similar to FIG. 15, but depicts the FAR results. The present microburst detection system generally produced fewer false alarms (e.g., 50% fewer) than the TDWR method, except for distances from 25–30 km, FIG. 17 depicts the CSI results, which indicate that the present microburst detection system generally outperformed the TDWR method. Again, the success of the microburst detection system generally decreased with scan resolution. The decrease in accuracy that occurs with scan resolution is not problematic at distances close to the radar, but becomes a problem at distances exceeding about 15 km from the radar. Therefore, it is preferred to use the microburst detection system in detecting microbursts when the ratio between the degrees of scan resolution and the distance to the radar is less than one degree: 3 km or 1:3. It is even more preferred to use a ratio less than 1:5.

SUMMARY

Variations may be made to the preferred embodiments described above. For example, the likelihood functions of FIGS. 5, 8, and 10 can be replaced with similar functions that are not necessarily linear. Additional considerations can be introduced, such as a likelihood image function or weighting factor for time proximity to recent microburst activity at a given position. This likelihood can be applied in Step P66 by multiplying the shapes of prior images by weighting factors that decrease with past events. Thus, the microburst position can be tracked from the data of prior scans as a ghost image of reducing magnitude. The present microburst detection system process is not limited to TDWR devices, and can be applied to any radar that measures wind velocity and reflectivity.

Those skilled in the art will understand that the preferred embodiments described hereinabove may be subjected to apparent modifications without departing from the scope and spirit of the invention. The inventors, accordingly, hereby state their intention to rely upon the Doctrine of Equivalents, in order to protect their full rights in the invention.

We claim:

1. A method for identifying a presence and locus of wind shear in a predefined area, said method comprising the steps of:

generating data indicative of said wind shear using a weather radar system; and converting said data from said weather radar system into a quantified likelihood of said presence and locus of said wind shear.

2. A method according to claim 1 wherein said step of generating includes:

transmitting a radio signal from a radar antenna;

receiving an echo of said transmitted radio signal off meteorologically significant structure; and translating said echo into at least one of the group of data consisting of: radial velocity of a point in a wind field, clutter, and reflectivity.

3. A method according to claim 1 wherein said step of converting includes:

generating at least one likelihood image each having a set of likelihood values corresponding thereto, wherein each likelihood value in each said set of likelihood values are selected according to a threshold delimiter that is characteristic of said wind shear;

applying a weighting factor to each said likelihood value in each said set of likelihood values; and generating a combined likelihood image based on said at least one likelihood image.

4. A method according to claim 3 wherein each of said at least one likelihood image is selected from the group consisting of: a wind field shear likelihood image, a clutter likelihood image, and a reflectivity likelihood image.

5. A method according to claim 3 wherein said step of applying includes:

selecting said weighting factor of about a 9:4:2 ratio as between a wind field shear likelihood image, a clutter likelihood image, and a reflectivity likelihood image respectively.

6. A method according to claim 3 wherein said step of generating at least one likelihood image includes:

calculating a wind field shear likelihood image from a two-dimensional least squares calculation that includes azimuthal and angular components of a radial wind velocity.

7. A method according to claim 3 wherein said step of generating a combined likelihood image includes:

averaging spatial and temporal components of a plurality of said likelihood values across a plurality of said wind field shear likelihood images to reject any of said likelihood values that fail to satisfy said threshold delimiters.

8. A method according to claim 3 wherein said step of generating a combined likelihood image includes:

dumping connected regions of a plurality of likelihood images where at least one said likelihood value in each of said connected regions satisfies said threshold delimiter;

identifying a dumped set of said plurality of likelihood images having connected regions therebetween as an indicator of said presence and locus of said wind shear.

9. An apparatus for identifying a presence and locus of wind shear in a predefined area, said apparatus comprising:

means for generating data indicative of said wind shear using a weather radar system; and means for converting said data from said weather radar system into a quantified likelihood of said presence and locus of said wind shear.

10. An apparatus according to claim 9 wherein said means for generating includes:

means for transmitting a radio signal from a radar antenna;

means for receding an echo of said transmitted radio signal off meteorologically significant structure; and means for translating said echo into at least one of the group of data consisting of: radial velocity of wind, clutter, and reflectivity.

11. An apparatus according to claim 9 wherein said means for converting includes:

means for generating at least one likelihood image each having a set of likelihood values corresponding thereto, wherein each likelihood value in each said set of likelihood values are selected according to a threshold delimiter that is characteristic of said wind shear;

means for applying a weighting factor to each said likelihood value in each said set of likelihood values; and means for generating a combined likelihood image based on said at least one likelihood image.

12. An apparatus according to claim 11 wherein each of said at least one likelihood image is selected from the group consisting of: a wind field shear likelihood image, a clutter likelihood image, and a reflectivity likelihood image.

13. An apparatus according to claim 11 wherein said means for applying includes:

selecting said weighting factor of about a 9:4:2 ratio as between a wind field shear likelihood image, a clutter image, and a reflectivity image respectively.

14. An apparatus according to claim 11 wherein said means for generating at least one wind shear likelihood image includes:

means for calculating a wind field shear image from a two-dimensional least squares that includes azimuthal and angular components of a radial wind velocity.

15. An apparatus according to claim 11 wherein said means for generating a combined likelihood image includes:

means for averaging spatial and temporal components of a plurality of said likelihood values across a plurality of said likelihood images to reject any of said likelihood values that fail to satisfy said threshold delimiters.

16. An apparatus according to claim 11 wherein said means for generating a combined likelihood image includes:

means for clumping connected regions of a plurality of likelihood images where at least one said likelihood value in each of said connected regions satisfies said threshold delimiter; and means for identifying a clumped set of said plurality of likelihood images having connected regions therebetween as an indicator of said wind shear.

17. A method in a processor for identifying a presence and locus of wind shear having predefined threshold delimiters for spatial and temporal characteristics, said method comprising the steps of:

generating data indicative of said wind shear using a weather radar system; and converting said data from said weather radar system into a plurality of likelihood images each having a corresponding set of likelihood values;

applying a weighting factor to each likelihood value in each said set of likelihood values, wherein each said likelihood value is accepted and rejected based on said threshold delimiter; and generating a combined likelihood image indicative of said wind shear based on said plurality of likelihood images.

18. A method according to claim 17 wherein said step of generating includes:

transmitting a radio signal from a radar antenna;

receiving an echo of said transmitted radio signal off meteorologically significant structure; and translating said echo into data of at least one data type from the group consisting of: radial velocity of wind, clutter, and reflectivity.

19. A method according to claim 17 wherein each of said plurality of likelihood images is selected from the group consisting of: a wind field shear likelihood image, a clutter likelihood image, and a reflectivity likelihood image.

20. A method according to claim 17 wherein said predefined threshold delimiters for spatial and temporal characteristics are defined by a microburst type of wind shear.

* * * * *